US012061741B2

(12) United States Patent
Lin et al.

(10) Patent No.: US 12,061,741 B2
(45) Date of Patent: Aug. 13, 2024

(54) EMBEDDED SYSTEM AND VIBRATION DRIVING METHOD

(71) Applicant: Industrial Technology Research Institute, Hsinchu (TW)

(72) Inventors: Hsuan-Yu Lin, Changhua County (TW); Cheng-Yen Tsai, Keelung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/857,044

(22) Filed: Jul. 4, 2022

(65) Prior Publication Data

US 2023/0205317 A1    Jun. 29, 2023

(30) Foreign Application Priority Data

Dec. 28, 2021   (TW) .................................. 110149039

(51) Int. Cl.
G06F 3/01      (2006.01)
G06F 9/30      (2018.01)
H04W 4/80      (2018.01)

(52) U.S. Cl.
CPC .............. G06F 3/016 (2013.01); G06F 3/014 (2013.01); G06F 9/30018 (2013.01); H04W 4/80 (2018.02)

(58) Field of Classification Search
None
See application file for complete search history.

(56) References Cited

U.S. PATENT DOCUMENTS

| | | | |
|---|---|---|---|
| 10,055,019 B2 | 8/2018 | Beran | |
| 10,649,532 B2 | 5/2020 | Cruz-Hernandez et al. | |
| 10,748,391 B2 | 8/2020 | Grant et al. | |
| 10,775,894 B2 | 9/2020 | Maalouf et al. | |
| 2017/0252643 A1* | 9/2017 | Chen | A63F 13/212 |
| 2017/0293361 A1 | 10/2017 | Lee et al. | |
| 2018/0028909 A1 | 2/2018 | Kim | |
| 2019/0041987 A1* | 2/2019 | Asfour | H04N 21/2387 |
| 2019/0377412 A1* | 12/2019 | Parastegari | G06F 3/016 |
| 2020/0128106 A1* | 4/2020 | McCormack | A63F 13/55 |
| 2020/0150768 A1* | 5/2020 | Kim | G06F 3/016 |

FOREIGN PATENT DOCUMENTS

| | | | |
|---|---|---|---|
| CN | 107158694 | | 9/2017 |
| CN | 113835518 A | * | 12/2021 |
| TW | I672168 | | 9/2019 |
| TW | I674134 | | 10/2019 |

OTHER PUBLICATIONS

"Office Action of Taiwan Counterpart Application", issued on Aug. 23, 2022, p. 1-p. 5.

* cited by examiner

Primary Examiner — Xuyang Xia
(74) Attorney, Agent, or Firm — JCIPRNET

(57) ABSTRACT

An embedded system and a vibration driving method are provided. The embedded system includes a vibration module, a Bluetooth module, a storage module, and a microcontroller unit. The vibration module includes a plurality of actuators. The Bluetooth module is configured to receive a Bluetooth signal provided by an external device. The storage module is configured to store a vibration type database. The microcontroller unit is coupled to the vibration module, the Bluetooth module, and the storage module. The microcontroller unit generates vibration type data according to the Bluetooth signal and the vibration type database. The microcontroller unit drives at least one of the plurality of actuators according to the vibration type data.

16 Claims, 17 Drawing Sheets

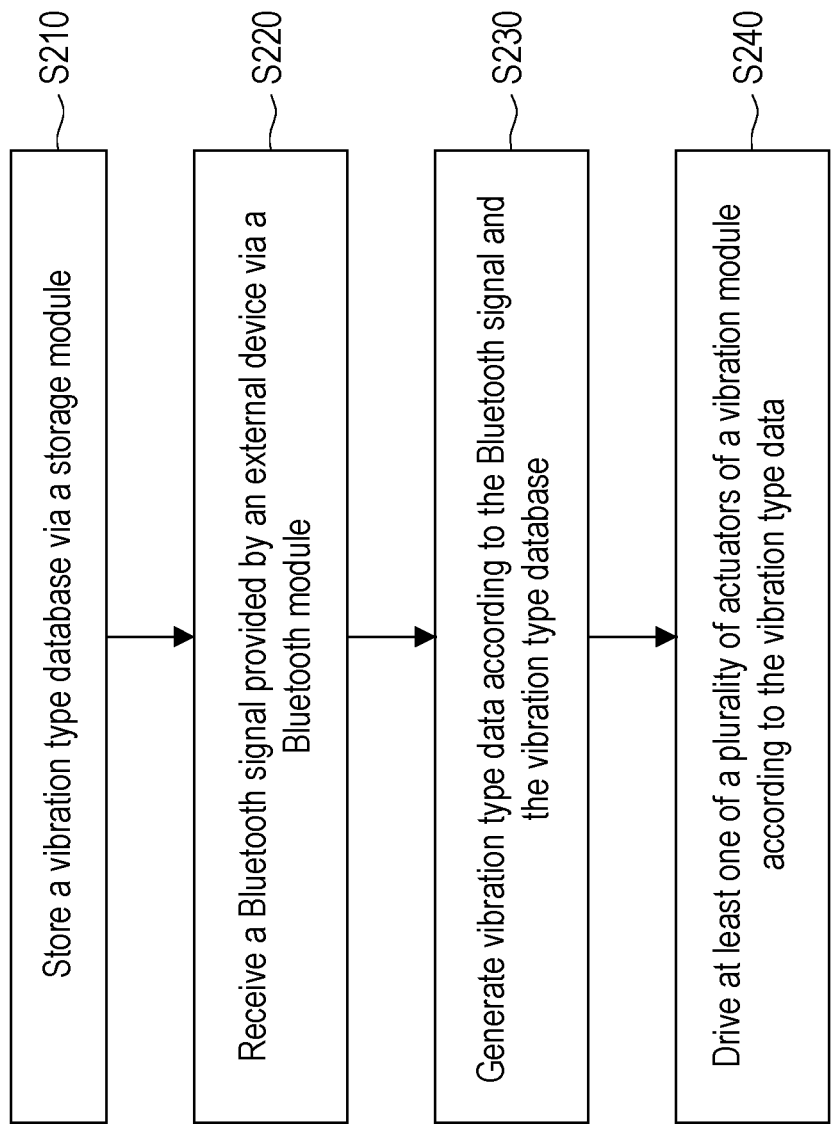

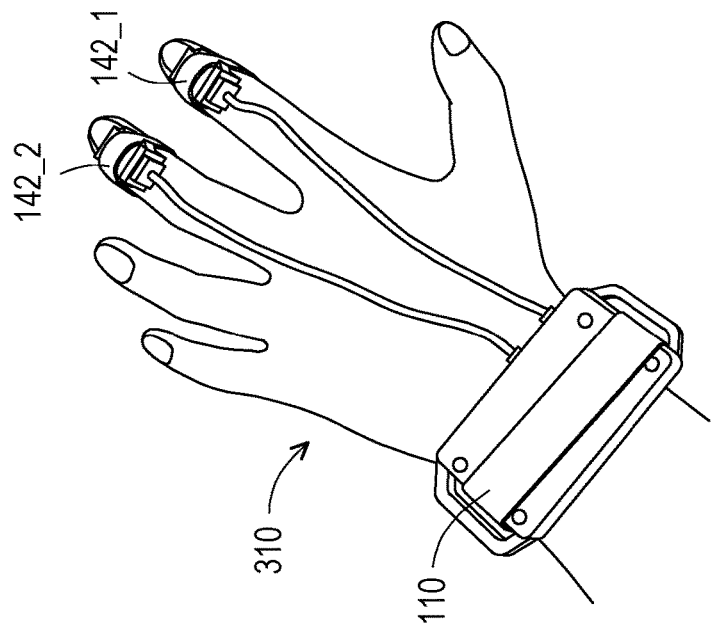
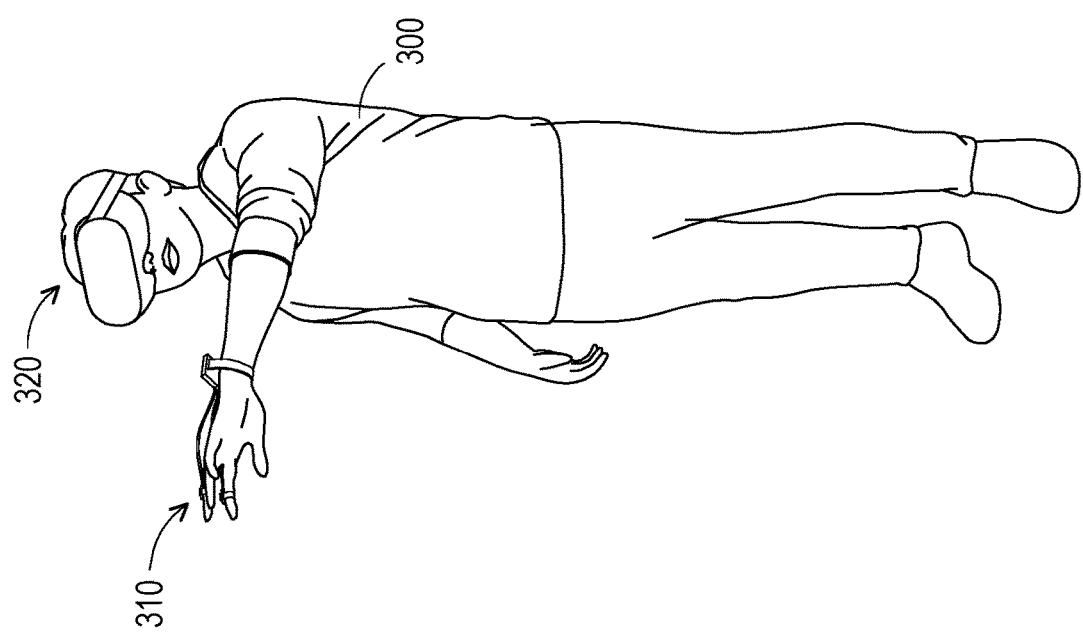
FIG. 3B
FIG. 3A

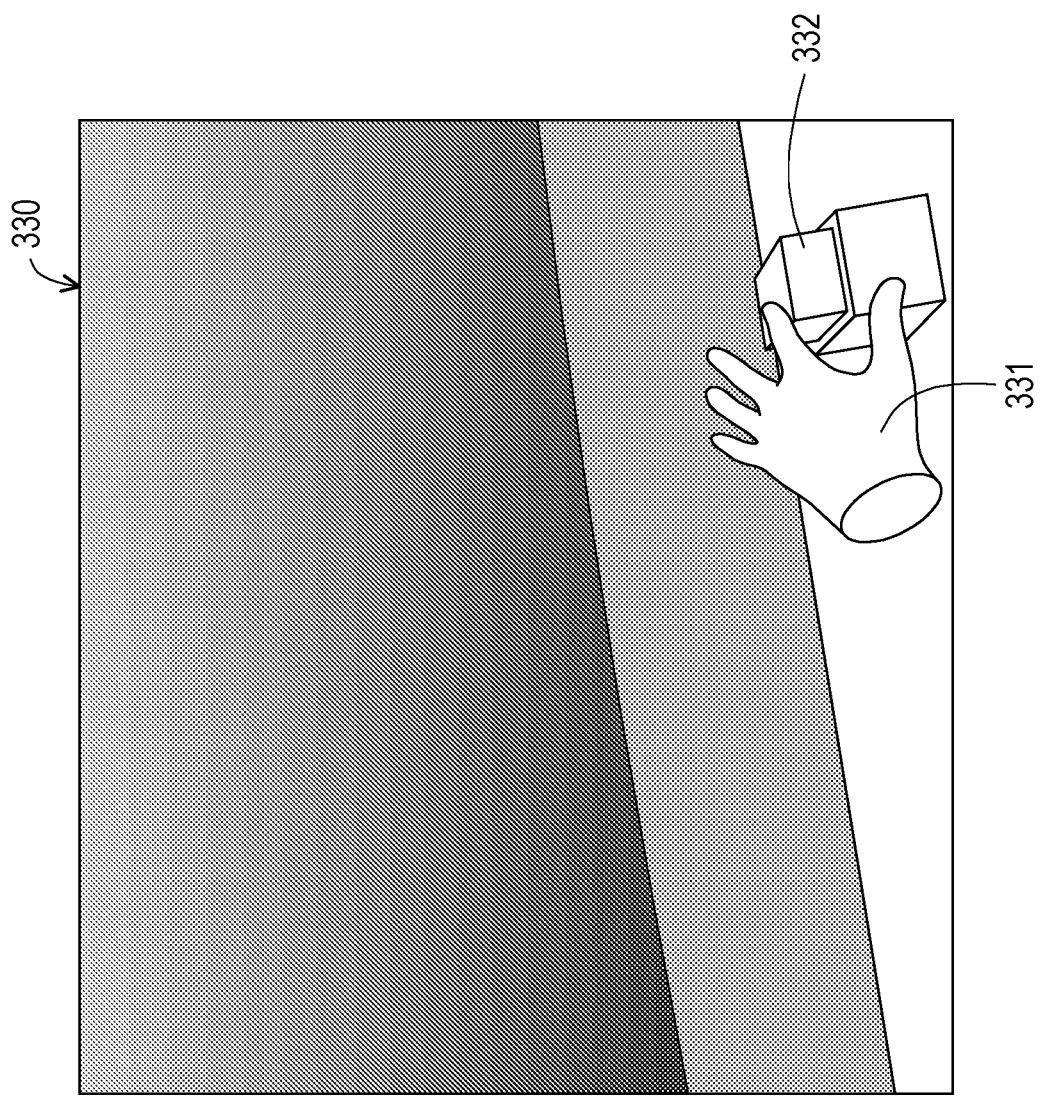

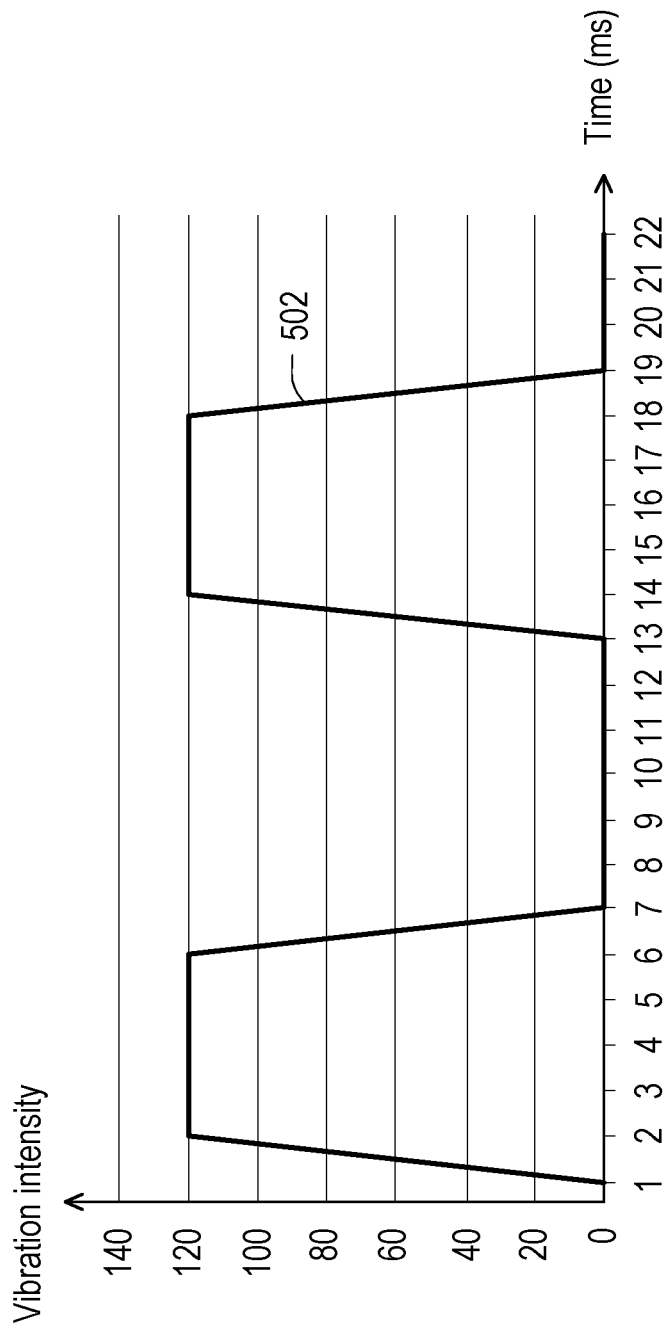

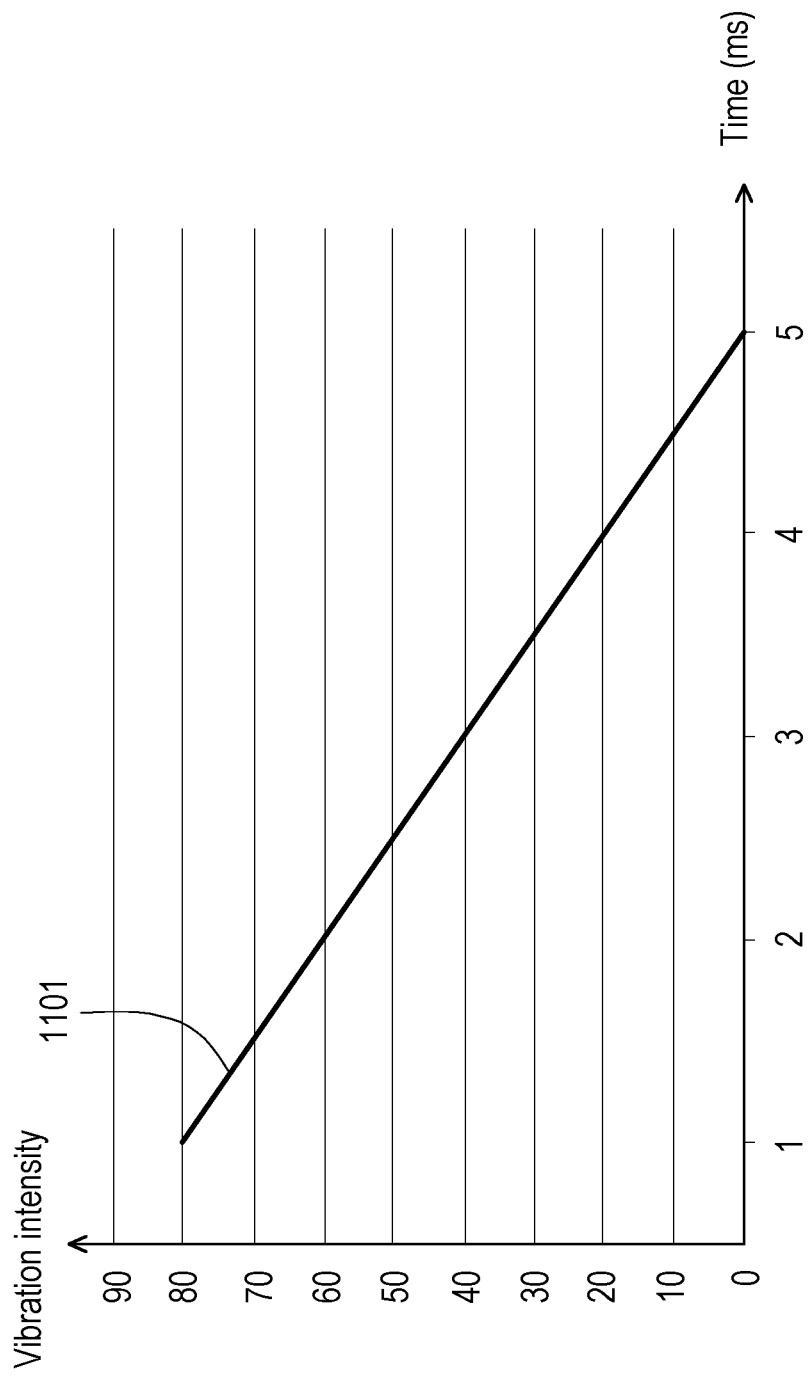

EMBEDDED SYSTEM AND VIBRATION DRIVING METHOD

CROSS-REFERENCE TO RELATED APPLICATION

This application claims the priority benefit of Taiwan application serial no. 110149039, filed on Dec. 28, 2021. The entirety of the above-mentioned patent application is hereby incorporated by reference herein and made a part of this specification.

TECHNICAL FIELD

The disclosure relates to an embedded system and a vibration driving method.

BACKGROUND

The use of multi-point haptic feedback in various application fields, such as virtual reality (VR), mixed reality (MR), VR training, and game applications is increasing daily. However, with the diversification and complexity of application scenarios and the increase in the amount of vibration type data, the traditional haptic feedback architecture has the issues of long data transmission time and/or long feedback latency.

SUMMARY

An embedded system of the disclosure includes a vibration module, a Bluetooth module, a storage module, and a microcontroller unit. The vibration module includes a plurality of actuators. The Bluetooth module is configured to receive a Bluetooth signal provided by an external device. The storage module is configured to store a vibration type database. The microcontroller unit is coupled to the vibration module, the Bluetooth module, and the storage module. The microcontroller unit generates vibration type data according to the Bluetooth signal and the vibration type database. The microcontroller unit drives at least one of the plurality of actuators according to the vibration type data.

A vibration driving method of the disclosure is suitable for an embedded system. The embedded system includes a vibration module, a Bluetooth module, and a storage module. A vibration driving method includes the following steps: storing a vibration type database via the storage module; receiving a Bluetooth signal provided by an external device via the Bluetooth module; generating vibration type data according to the Bluetooth signal and the vibration type database; and driving at least one of a plurality of actuators of the vibration module according to the vibration type data.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 2 is a flowchart of a vibration driving method of an embodiment of the disclosure.

FIG. 3A to FIG. 3C are schematic diagrams of an application environment of an embodiment of the disclosure.

FIG. 5A and FIG. 5B are schematic diagrams of two kinds of first vibration type data of an embodiment of the disclosure.

FIG. 9A and FIG. 9B are schematic diagrams of obtaining two kinds of third vibration type data of an embodiment of the disclosure.

FIG. 11A and FIG. 11B are schematic diagrams of another two kinds of third vibration type data of an embodiment of the disclosure.

DETAILED DESCRIPTION OF DISCLOSED EMBODIMENTS

Figure 1:
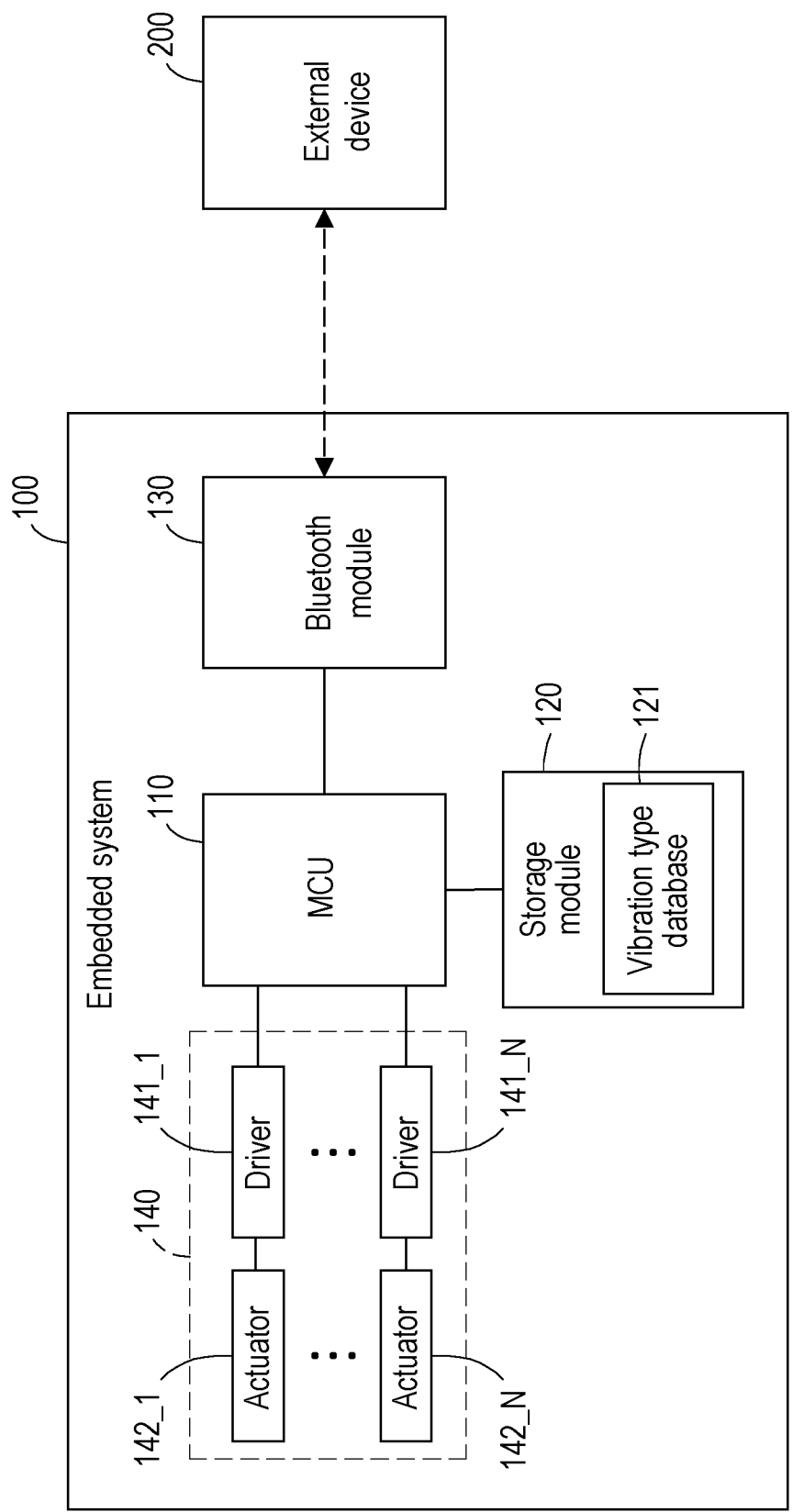
FIG. 1 is a schematic circuit diagram of an embedded system of an embodiment of the disclosure.

To make the contents of the disclosure more easily understood, embodiments are provided below as examples of the plausibility of implementation of the disclosure. Moreover, when applicable, devices/members/steps having the same reference numerals in figures and embodiments represent the same or similar parts.

FIG. 1 is a schematic circuit diagram of an embedded system of an embodiment of the disclosure. Referring to FIG. 1, an embedded system 100 includes a microcontroller unit (MCU) 110, a storage module 120, a Bluetooth module 130, and a vibration module 140. The MCU 110 is coupled to the storage module 120, the Bluetooth module 130, and the vibration module 140. The vibration module 140 includes a plurality of drivers 141_1 to 141_N and actuators 142_1 to 142_N, wherein N is a positive integer. The MCU 110 is coupled to the drivers 141_1 to 141_N, and the drivers 141_1 to 141_N are further coupled to the actuators 142_1 to 142_N. In the present embodiment, an external device 200 is also provided with a corresponding Bluetooth module or a Bluetooth communication interface. The embedded system 100 may communicate with the external device 200 via the Bluetooth module 130, and may receive a Bluetooth signal provided by the external device 200.

In the present embodiment, the embedded system 100 may be, for example, integrated into an equipment or interactive member such as a wearable device, a handheld device, or a portable control device, or an interactive accessory to provide real-time haptic feedback in the form of vibration. In the present embodiment, the external device 200 may include, for example, an equipment or system capable of sensing the user's operating behavior such as a computer host, a touch display device, or a control device, and may establish a connection with the embedded system 100. In the present embodiment, the external device 200 may output the corresponding Bluetooth signal to the embedded system 100 according to the operating behavior of the user, so that the embedded system 100 may generate the corresponding vibration type data according to the Bluetooth signal, and drive at least one of the actuators 142_1 to 142_N via the drivers 141_1 to 141_N according to the vibration type data to provide a haptic feedback effect in the form of vibration that may be synchronized with the user's current operating behavior.

In the present embodiment, the MCU 110 may be, for example, integrated with a CPU, a memory, and a related I/O interface, and may include a circuit having a specific function or executable specific firmware or software to implement the related operation, function, and communication function described in each embodiment of the disclosure. In the present embodiment, the storage module 120 may include a memory, and the memory may be, for example, a non-volatile memory such as a read-only memory (ROM), an erasable programmable ROM (EPROM), a volatile memory such as a random-access memory (RAM), a hard disc drive, a semiconductor memory, or the like. The storage module 120 may pre-store a vibration type database 121 for the MCU 110 to read first vibration type data and to write data.

FIG. 2 is a flowchart of a vibration driving method of an embodiment of the disclosure. FIG. 3A to FIG. 3C are schematic diagrams of an application environment of an embodiment of the disclosure. Referring to FIG. 1 to FIG. 3C, the embedded system 100 may perform steps S210 to S240 as shown in FIG. 2 to perform a vibration driving function. In step S210, the embedded system 100 may pre-establish (or load) the vibration type database 121 to store the vibration type database 121 via the storage module 120. The vibration type database 121 may store a plurality of first vibration type data corresponding to a plurality of different vibration type numbers. In step S220, when a vibration event occurs, the external device 200 may synchronously send a corresponding Bluetooth signal, so that the embedded system 100 may receive the Bluetooth signal provided by the external device 200 via the Bluetooth module 130. As shown in FIG. 3A, a virtual reality (VR) application is taken as an example. A user 300 may, for example, wear a glove device 310 and a head-mounted VR display 320, wherein the embedded system 100 may be integrated in the glove device 310. The glove device 310 and the head-mounted VR display 320 may also be coupled to a computer host configured to execute the corresponding VR software. As shown in FIG. 3B, the MCU 110 and the drivers 141_1 and 141_2 of the embedded system 100 may be integrated into the glove device 310. The actuators 142_1 and 142_2 may, for example, be disposed on two finger positions of the glove device 310 and coupled to the MCU 110 integrated in the wrist position of the glove device 310. As shown in FIG. 3C, when the user 300 grabs a virtual object 332 via a virtual hand 331 in a VR environment 330, the computer host running the corresponding VR software may transmit the corresponding Bluetooth signal to the MCU 110 (via the Bluetooth module 130) according to the vibration event of the virtual hand 331 grabbing or clicking the virtual object 332.

In step S230, the MCU 110 of the embedded system 100 may generate vibration type data according to the Bluetooth signal and the vibration type database 121. In the present embodiment, the MCU 110 may read the vibration type database 121 according to the vibration event data in the Bluetooth signal to obtain the corresponding first vibration type data. In step S240, the MCU 110 may drive at least one of the actuators 142_1 to 142_N of the vibration module 140 according to the vibration type data. As shown in FIG. 3B, the MCU 110 may output a driving signal to the drivers 141_1 and 141_2 according to the first vibration type data, so that the drivers 141_1 and 141_2 may drive the actuators 142_1 and 142_2, so that the index finger and the middle finger in the hand portion of the user 300 wearing the glove device 310 may feel the haptic feedback effect in real-time in the form of vibration. Therefore, the embedded system 100 and the vibration driving method of the present embodiment may provide a haptic feedback effect in the form of vibration that may be synchronized with the current operating behavior of the user.

Figure 4A:
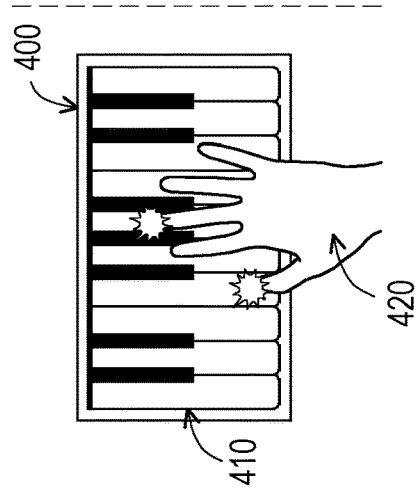
FIG. 4A to FIG. 4C are schematic diagrams of obtaining first vibration type data of an embodiment of the disclosure.
Figure 4B:
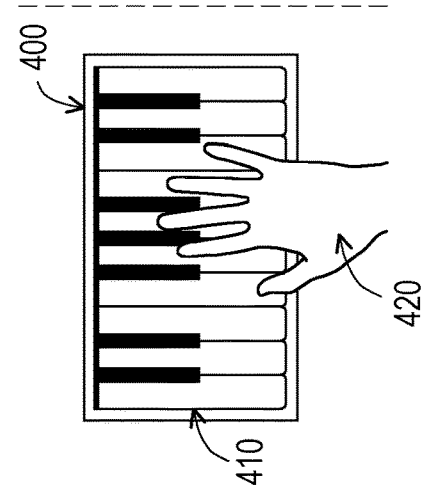
Figure 4C:
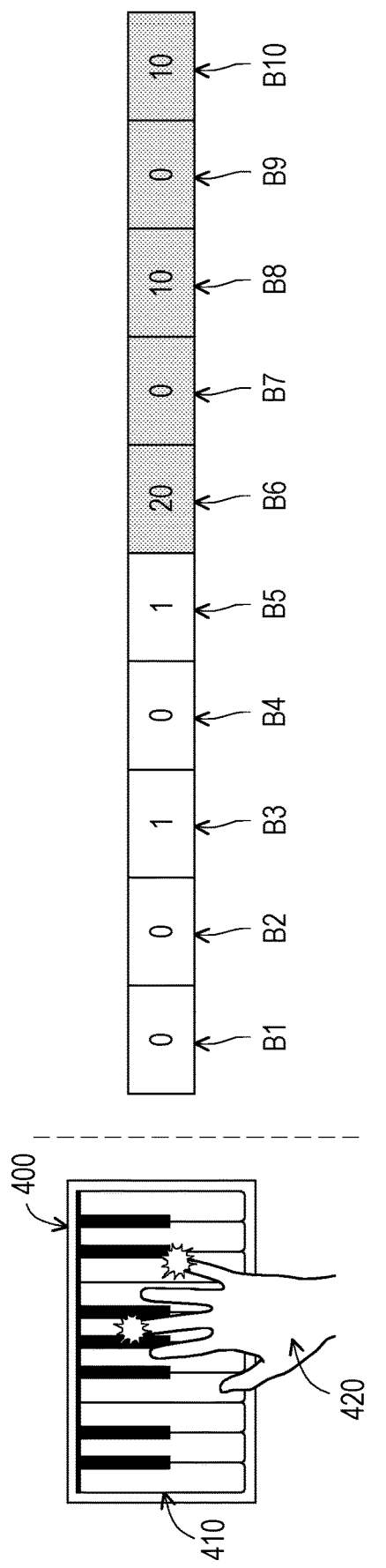
Figure 5A:
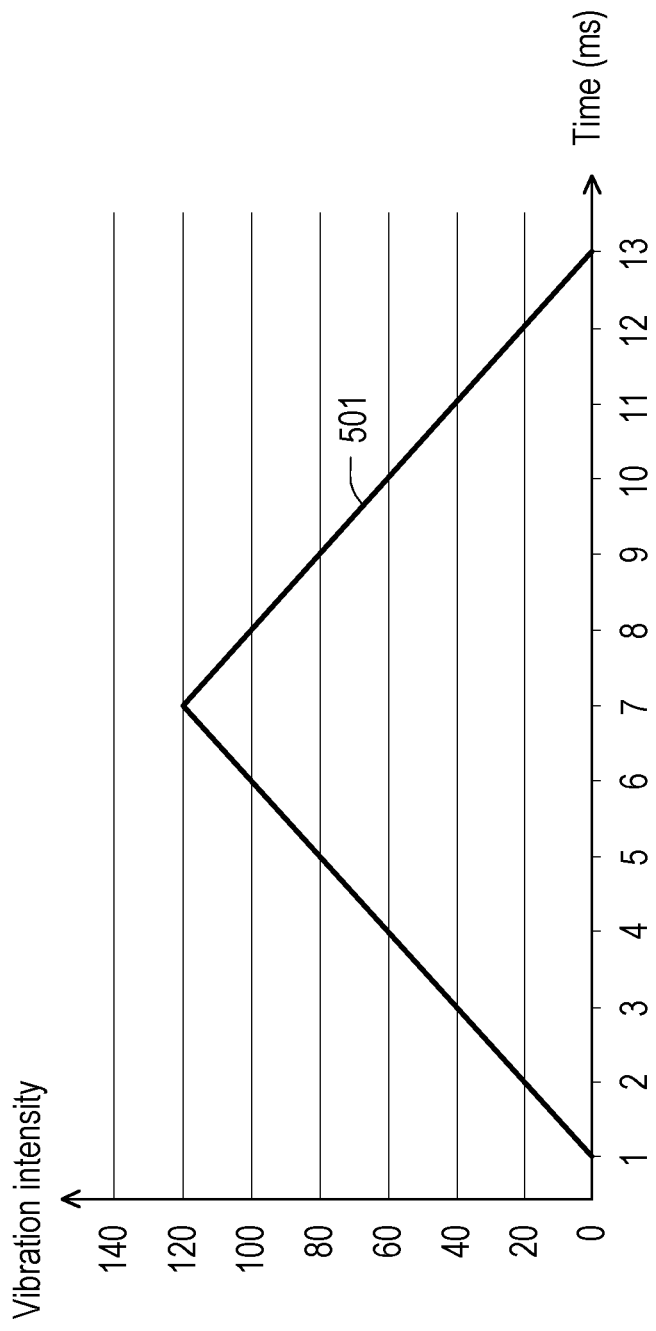

FIG. 4A to FIG. 4C are schematic diagrams of obtaining first vibration type data of an embodiment of the disclosure. FIG. 5A and FIG. 5B are schematic diagrams of two kinds of first vibration type data of an embodiment of the disclosure. Referring to FIG. 1 and FIG. 4A to FIG. 5B, a virtual piano application is taken as an example. A virtual piano 410 may be displayed in a VR environment (virtual space) 400, and the user may wear a glove device to perform a touch action (a piano-playing action) in the VR environment 400 via a virtual hand 420, wherein the actuators 142_1 to 142_N of the embedded system 100 may be integrated into each finger portion on the glove device. As shown in FIG. 4A to FIG. 4C, when the user's right hand touches the virtual piano 410, the external device 200 may send a corresponding Bluetooth signal to the embedded system 100. The MCU 110 may obtain vibration event data in the Bluetooth signal via the Bluetooth module 130. The vibration event data may be, for example, one 10-byte data, and the MCU 110 may store the vibration event data in a plurality of Bluetooth data buffers B1 to B10 of the MCU 110. Each of the Bluetooth data buffers may store one corresponding byte of data. The Bluetooth data buffers B1 to B5 may be configured to store 5 event bytes in the vibration event data corresponding to five fingers, and the Bluetooth data buffers B6 to B10 may be configured to store 5 vibration type class bytes in the vibration event data corresponding to five fingers. A value of "1" in the event bytes may indicate that a vibration event currently occurs, and a value of "0" in the event bytes may indicate that a vibration event does not currently occur. A value of "10" and "20" of the vibration type class bytes may represent different vibration type classes respectively, and a value of "0" of the vibration type class bytes may represent a non-vibration type.

When the MCU 110 determines the Bluetooth signal includes vibration event data, the MCU 110 may search the vibration type database 121 according to the vibration type class bytes of the vibration event data (e.g., the data stored in the Bluetooth data buffers B6 to B10) to obtain the corresponding first vibration type data. Moreover, the MCU 110 may determine whether to drive the actuators 142_1 to 142_N according to the first vibration type data according to the event bytes of the vibration event data (for example, the data stored in the Bluetooth data buffers B1 to B5).

First, as shown in FIG. 4, the VR environment 400 may be a VR image generated by the external device 200 of FIG. 1 executing a corresponding VR program, wherein the external device 200 may be, for example, a computer or other similar devices. When the thumb and middle finger of the virtual hand 420 (virtual right hand) touch the virtual piano 410, the external device 200 may send a corresponding Bluetooth signal to the MCU 110 according to the operation result of the virtual hand 420 in the VR environment 400, so that the Bluetooth data buffers B1 to B10 may store the data shown in FIG. 4A. In this regard, the MCU 110 may search the vibration type database 121 according to the value "20" of the vibration type class bytes stored in the Bluetooth data buffers B6 and B8 to obtain the corresponding first vibration type data. The first vibration type data corresponding to the value "20" of the vibration type class bytes may enable the actuators to achieve the vibration form as shown in FIG. 5B. As shown in FIG. 5B, corresponding to the value "20" of the vibration type class bytes, the actuators may provide a vibration effect having a vibration intensity variation curve 502 for a time between 2 milliseconds (ms) and 100 ms. Moreover, the MCU 110 may determine, according to the value "1" of the event bytes stored in the Bluetooth data buffers B1 and B3, that a vibration event occurs at the positions corresponding to the thumb and the middle finger of the glove device to determine to drive the corresponding actuator according to the first vibration type data corresponding to the value "20" of the vibration type class bytes, so as to provide the vibration effect of the vibration intensity variation curve 502 as shown in FIG. 5B.

Next, since the vibration type class bytes and the event bytes of the vibration event data are dynamically updated in response to a plurality of vibration events corresponding to different actuators, the MCU 110 may update the vibration type class bytes and the event bytes of the vibration event data to the Bluetooth data buffers B1 to B10 to dynamically drive or stop the actuators 142_1 to 142_N according to a data update status of the Bluetooth data buffers B1 to B10. As shown in FIG. 4B, when none of the fingers of the virtual hand 420 (virtual right hand) touches the virtual piano 410, the MCU 110 may rewrite the values of the event bytes stored in the Bluetooth data buffers B1 to B5 to "0" in the next (vibration type) data update cycle after the previous vibration event occurs, so that the Bluetooth data buffers B1 to B10 may be updated to store the data as shown in FIG. 4B. The values of the event bytes stored in the Bluetooth data buffers B1 to B5 are all "0", that is, a vibration event does not occur at the positions of any of the fingers of the glove device. The vibration type class bytes stored in the Bluetooth data buffers B6 to B10 respectively maintain the previous data content.

Next, as shown in FIG. 4C, when the little finger and middle finger of the virtual hand 420 (virtual right hand) touch the virtual piano 410, the external device 200 may send the corresponding Bluetooth signal to the MCU 110, so that the Bluetooth data buffers B1 to B10 may be updated to store the data as shown in FIG. 4C. The value of the event bytes stored in the Bluetooth data buffers B3 and B5 is "1", and the rest are the value "0", that is, a vibration event occurs at the positions of the middle finger and the little finger. The vibration type class bytes stored in the Bluetooth data buffers B8 and B10 respectively may be updated to the value "10", and the vibration type class bytes stored in the Bluetooth data buffers B6, B7, and B9 respectively maintain the previous data content. In this regard, the MCU 110 may search the vibration type database 121 according to the value "10" of the vibration type class byte stored in the Bluetooth data buffers B8 and B10 to obtain the corresponding first vibration type data. The first vibration type data corresponding to the value "10" of the vibration type class byte may enable the actuators to achieve the vibration form as shown in FIG. 5A. As shown in FIG. 5A, corresponding to the value "10" of the vibration type class bytes, the actuators may provide a vibration effect having a vibration intensity variation curve 501 for a time between 2 ms and 100 ms. Moreover, the MCU 110 may determine, according to the value "1" of the event bytes stored in the Bluetooth data buffers B3 and B5, that a vibration event occurs at the positions corresponding to the middle finger and the little finger of the glove device to determine to drive the corresponding actuator according to the first vibration type data corresponding to the value "10" of the vibration type class bytes, so as to provide the vibration effect of the vibration intensity variation curve 501 as shown in FIG. 5A. In this way, the embedded system 100 and the vibration driving method of the present embodiment may enable the user to feel the real-time vibration feedback effect during the operation of the virtual piano 410.

Figure 6:
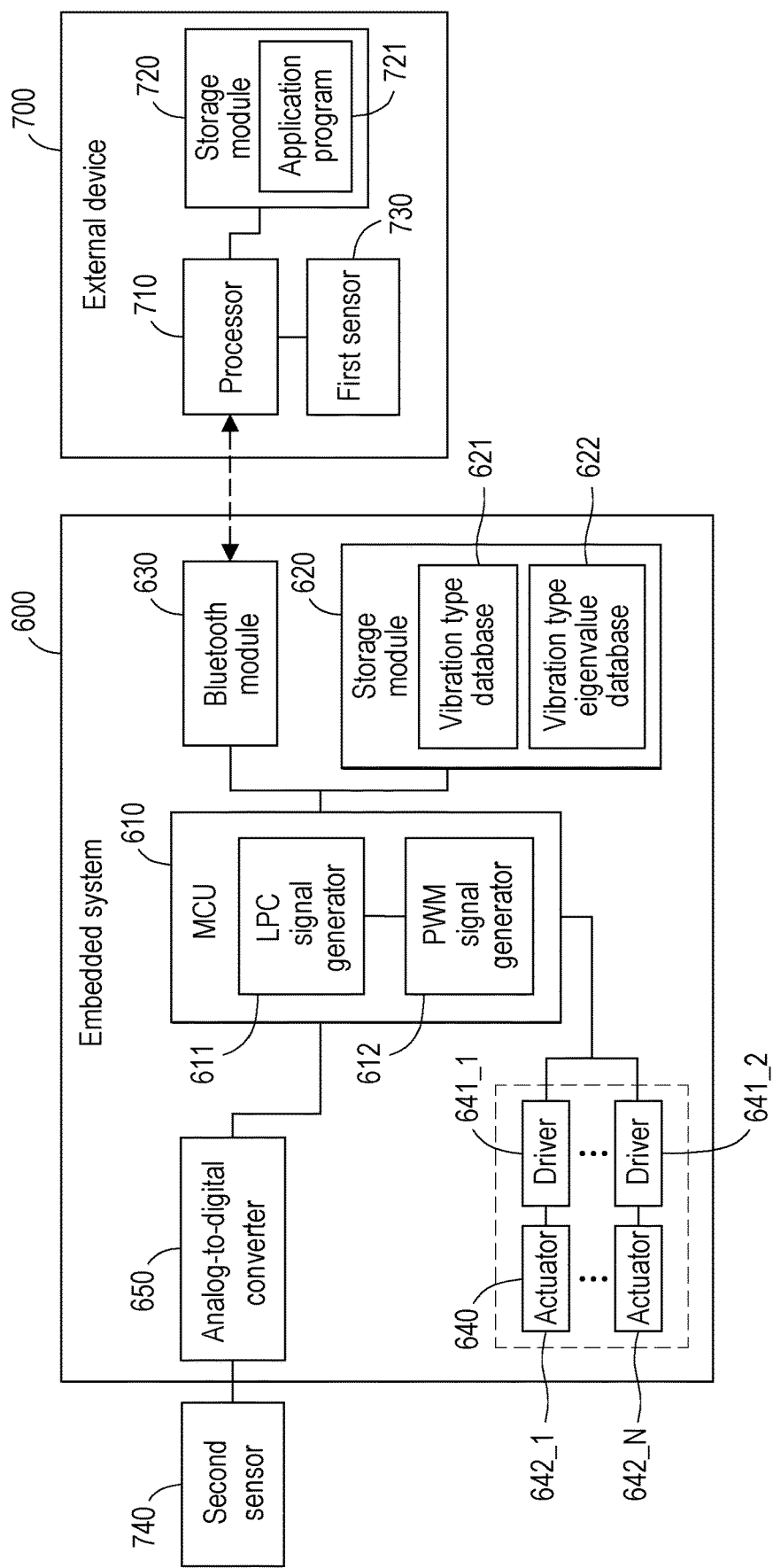
FIG. 6 is a schematic circuit diagram of an embedded system of another embodiment of the disclosure.

FIG. 6 is a schematic circuit diagram of an embedded system of another embodiment of the disclosure. Referring to FIG. 6, an embedded system 600 includes an MCU 610, a storage module 620, a Bluetooth module 630, a vibration module 640, and an analog-to-digital converter (ADC) 650. The MCU 610 is coupled to the storage module 620, the Bluetooth module 630, the vibration module 640, and the ADC 650. The MCU 610 is coupled to the storage module 620, the Bluetooth module 630, the vibration module 640, and the ADC 650. The vibration module 640 includes a plurality of drivers 641_1 to 641_N and actuators 642_1 to 642_N. In the present embodiment, the MCU 610 may include a linear predictive coding (LPC) signal generator 611 and a pulse-width modulation (PWM) signal generator 612. The storage module 620 may store a vibration type database 621 and a vibration type eigenvalue database 622. It should be mentioned that, the embedded system 600 and an external device 700 of the present embodiment may implement the processes described above in FIG. 2 to FIG. 5B and the implementation of obtaining the first vibration type data from the vibration type database 621. In this regard, the related technical features of the embedded system 600 and the external device 700 are also as provided in the descriptions of FIG. 1 to FIG. 5B, and are not repeated herein.

In the present embodiment, the external device 700 is also provided with a corresponding Bluetooth module or a Bluetooth communication interface. The embedded system 600 may communicate with the external device 700 via the Bluetooth module 630, and may receive a Bluetooth signal provided by the external device 700. The external device 700 may include a processor 710, a storage module 720, and a first sensor 730. The storage module 720 may store an application program 721. In the present embodiment, the embedded system 600 may also be coupled to a second sensor 740 via the ADC 650. In the present embodiment, the second sensor 740 may be integrated in the external device 700 or be independent of the external device 700, which is not limited in the disclosure.

In the present embodiment, the external device 700 may generate a Bluetooth signal according to a first sensing signal provided by the first sensor 730 and an application information provided by the application program 721 of the external device 700. Alternatively, the external device 700 may directly provide the sensing signal provided by the first sensor 730 to the embedded system 600 via the Bluetooth signal. Accordingly, when the MCU 610 determines that the Bluetooth signal includes the sensing signal, or the MCU 610 directly receives the sensing signal provided by the first sensor 730, the MCU 610 may execute a synthesis module to select a plurality of specific vibration type eigenvalues from the vibration type eigenvalue database 622 according to the vibration event data provided by the Bluetooth signal and the sensing signal, so as to synthesize second vibration type data according to the vibration type eigenvalues. Moreover, in an embodiment, the MCU 610 may also receive a third sensing signal provided by the second sensor 740 at the same time, and select a plurality of specific vibration type eigenvalues according to the vibration event data and the sensing signal to synthesize the second vibration type data according to the plurality of vibration type eigenvalues.

However, the method of generating the second vibration type data is described in detail with reference to the embodiments of FIG. 7 and FIG. 8 below.

In the present embodiment, the MCU 610 of the embedded system 600 may choose to obtain the first vibration type data by searching the vibration type database 621 according to the signal content or data format of the received Bluetooth signal, or synthesize the second vibration type data by obtaining a plurality of vibration type eigenvalues via the vibration type eigenvalue database 622. When the MCU 610 determines that the Bluetooth signal includes vibration event data, the MCU 610 may choose to obtain the first vibration type data by searching the vibration type database 621 to drive at least one of the actuators 642_1 to 642_N via the drivers 641_1 to 641_N according to the first vibration type data. In addition, when the MCU 610 determines that the Bluetooth signal includes the sensing signal and does not include the vibration event data, the MCU 610 may choose to drive at least one of the actuators 642_1 to 642_N via the drivers 641_1 to 641_N according to the second vibration type data. Or, when the MCU 610 obtains the first vibration type data and the second vibration type data for the current touch event, the MCU 610 may select the first vibration type data or the second vibration type data to drive at least one of the actuators 642_1 to 642_N via the drivers 641_1 to 641_N.

Figure 7:
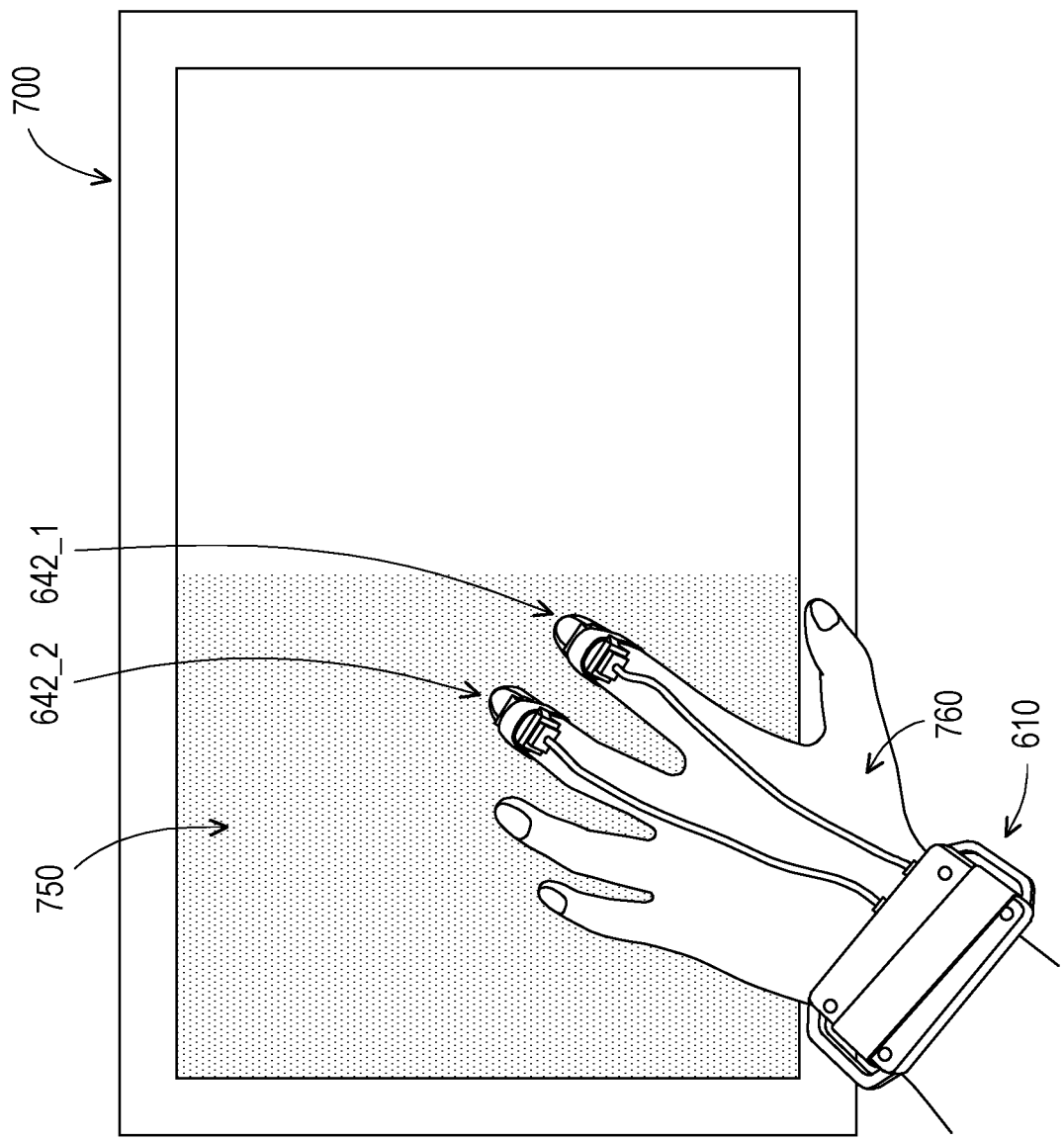
FIG. 7 is a schematic diagram of an application environment of another embodiment of the disclosure.
Figure 8:
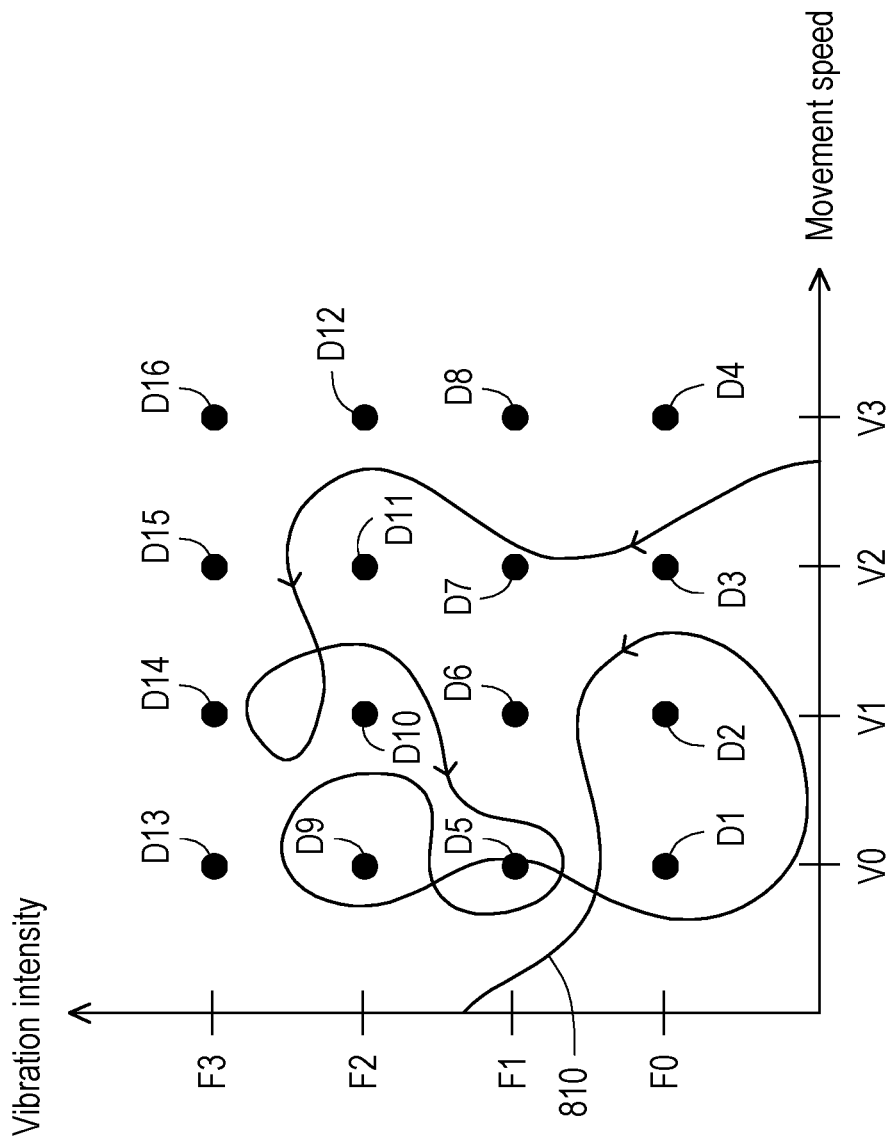
FIG. 8 is a schematic diagram of obtaining second vibration type data of an embodiment of the disclosure.

FIG. 7 is a schematic diagram of an application environment of another embodiment of the disclosure. FIG. 8 is a schematic diagram of obtaining the second vibration type data of an embodiment of the disclosure. Referring to FIG. 6 to FIG. 8, the embedded system 600 may be integrated in a glove device 760. The actuators 642_1 and 642_2 of the embedded system 600 may, for example, be integrated on two finger positions of the glove device 760 and coupled to the MCU 610 integrated in the wrist position of the glove device 760. In the present embodiment, the external device 700 may be, for example, a tablet computer. For example, the first sensor 730 may be, for example, a touch panel of a tablet computer, and is configured to output touch position information to the processor 710 so that the processor 710 may generate a speed sensing signal according to the touch position information. The second sensor 740 may be, for example, a pressure sensor disposed on the glove device 760, and is configured to directly output a pressure sensing signal in analog format to the ADC 650 of the embedded system 600, so that the ADC 650 further provides the pressure sensing signal in analog format to the MCU 610.

As shown in FIG. 7, a virtual touch scenario is taken as an example. The tablet computer (i.e., the external device 700) may display a virtual touch scenario 750 via the touch screen, and the user may wear the glove device 760 to perform a touch action (e.g., touching virtual grass) on the touch screen of the tablet computer. In the touch process, the tablet computer may return the speed sensing signal and the pressure sensing signal to the embedded system 600 in real-time, and the embedded system 600 may also obtain the pressure sensing signal from the second sensor 740, so that the MCU 610 may establish the numerical relationship shown in FIG. 8 according to the speed sensing signal and the pressure sensing signal. In this regard, a touch change path 810 varying with time corresponding to the pressing intensity and movement speed of the user's fingers on the virtual touch scenario 750 may be as shown in FIG. 8. In the schematic diagram of FIG. 8, the MCU 610 may preset a plurality of feature points D1 to D16 corresponding to different pressing intensities F0 to F3 and different movement speeds V0 to V3, wherein the feature points D1 to D16 correspond to the eigenvalues of different vibration types respectively. The MCU 610 may determine in real-time and select one or a plurality of feature points closest to the position of the touch change path 810 corresponding to the user's current pressing intensity and finger movement speed along the touch change path 810. Next, the MCU 610 may synthesize the second vibration type data according to the selected one or plurality of vibration type eigenvalues. For example, when the MCU 610 determines and selects the position of the touch change path 810 corresponding to the user's current pressing intensity and the finger movement speed is closest to the feature point D2 and the feature point D3, the MCU 610 may synthesize the second vibration type data according to the vibration type eigenvalues corresponding to the feature point D2 and the feature point D3 respectively. As a result, the MCU 610 may output a driving signal to the drivers 641_1 and 641_2 according to the second vibration type data, so that the drivers 641_1 and 641_2 may drive the actuators 642_1 and 642_2 to allow the user to feel the haptic feedback effect in real-time in the form of vibration varying with the pressing intensity and movement speed of the fingers during the process of contacting the virtual touch scenario 750.

Figures 9A, 9B:
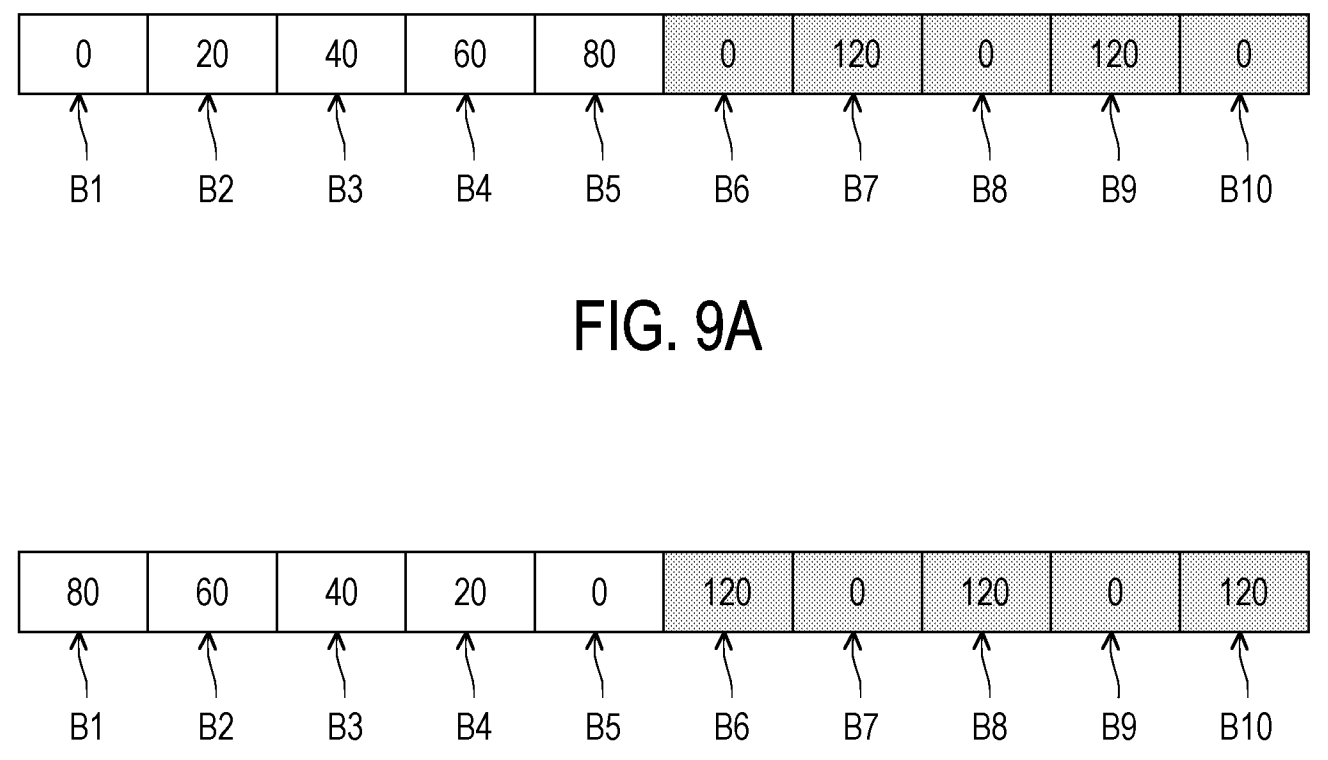
Figure 10A:
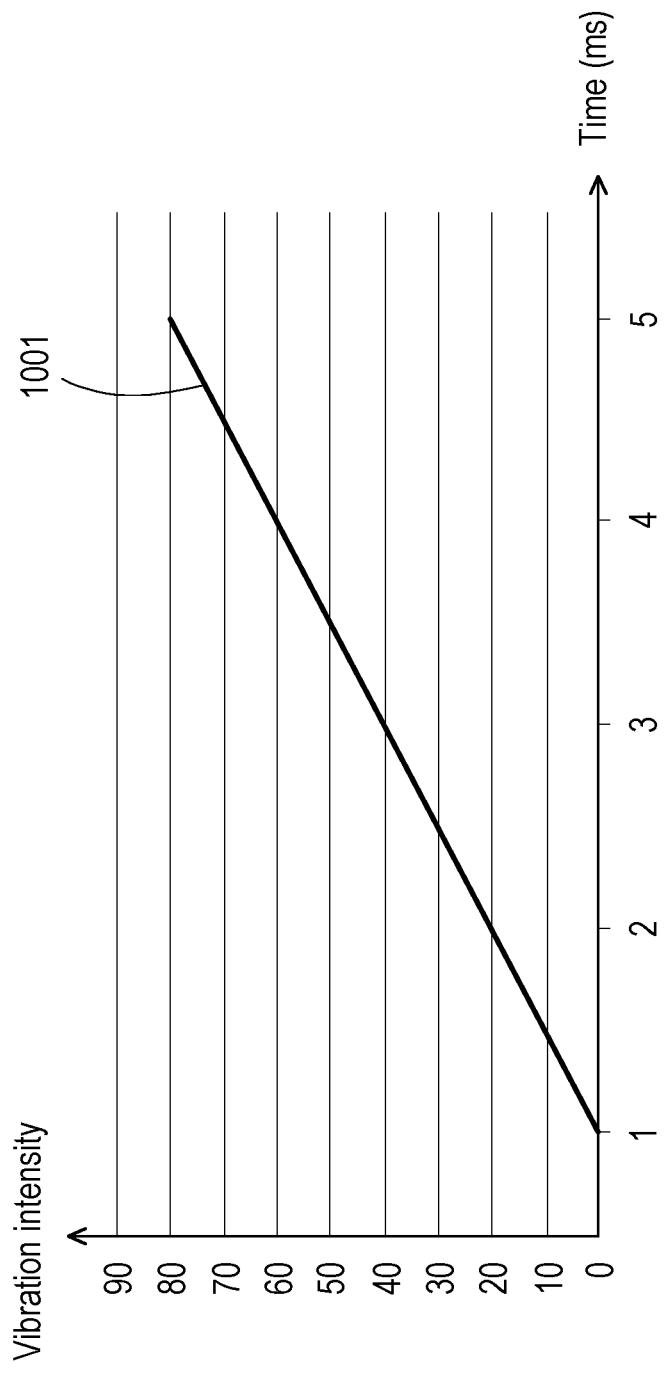
FIG. 10A and FIG. 10B are schematic diagrams of two kinds of third vibration type data of an embodiment of the disclosure.
Figure 10B:
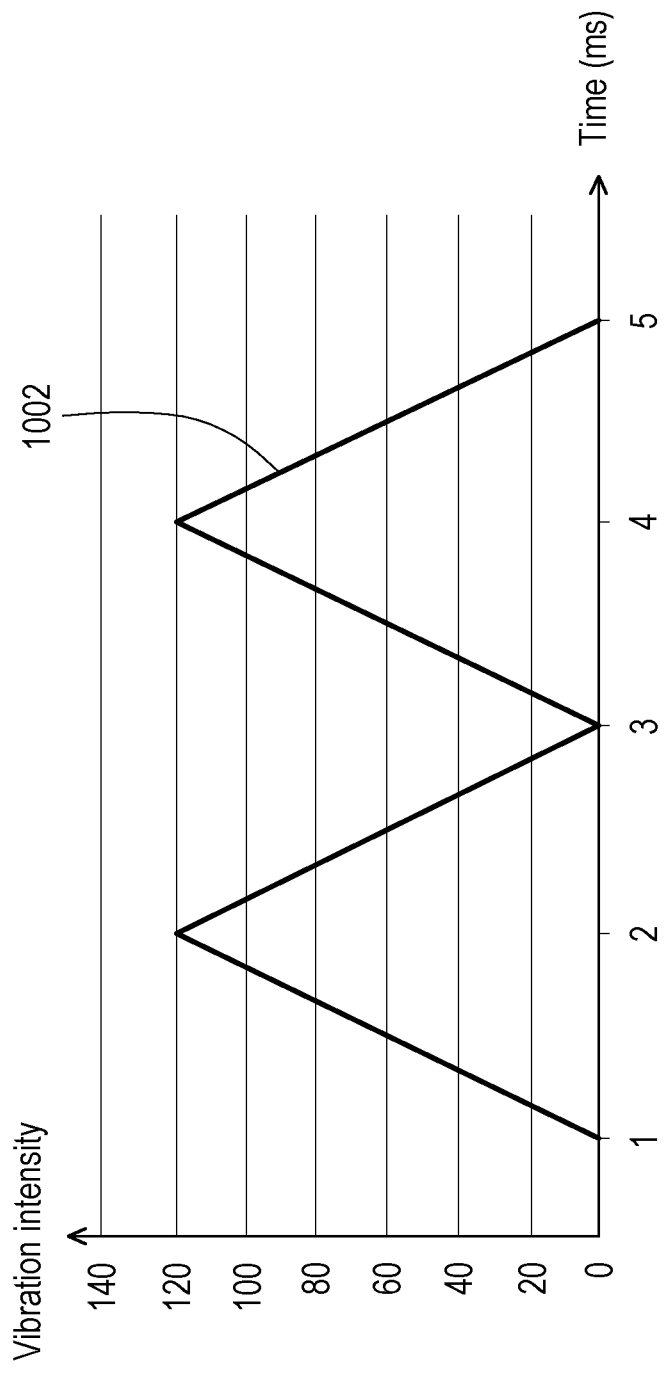
Figure 11B:
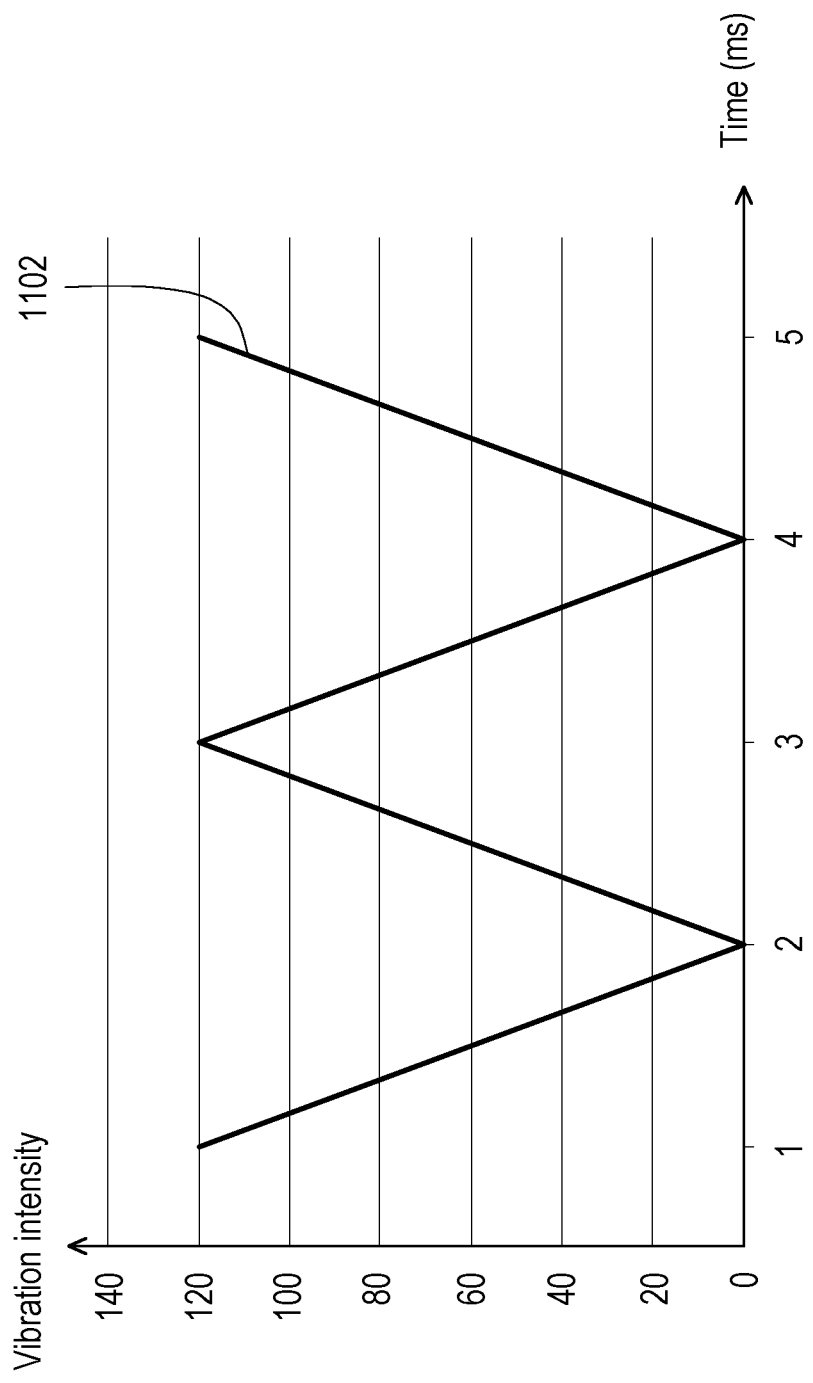

FIG. 9A and FIG. 9B are schematic diagrams of obtaining two kinds of third vibration type data of an embodiment of the disclosure. FIG. 10A and FIG. 10B are schematic diagrams of two kinds of third vibration type data of an embodiment of the disclosure. FIG. 11A and FIG. 11B are schematic diagrams of another two kinds of third vibration type data of an embodiment of the disclosure. Referring to FIG. 6, FIG. 7, and FIG. 9A to FIG. 11B, the processor 710 of the external device 700 may also directly transmit third vibration type data (without external sensing data) to the embedded system 600 via a Bluetooth signal. Or, the processor 710 of the external device 700 may obtain the third vibration type data according to the touch position information output by the first sensor 730 (e.g., the touch panel of the tablet computer) and directly provide the third vibration type data to the embedded system 600 via the Bluetooth signal. In the present embodiment, when the MCU 610 determines the Bluetooth signal received by the Bluetooth module 630 includes the third vibration type data corresponding to at least one of the actuators 642_1 to 642_N, the MCU 610 may preferentially choose to drive at least one of the actuators 642_1 to 642_N according to the third vibration type data. As shown in FIG. 9A and FIG. 9B, the MCU 610 may update a plurality of consecutive vibration type class bytes of the third vibration type data within a predetermined time interval (e.g., one frame time interval) to the plurality of Bluetooth data buffers B1 to B10 to continuously drive at least one of the actuators 642_1 to 642_N within a predetermined time interval according to the data update status of the Bluetooth data buffers B1 to B10. It should be mentioned that, a vibration type frequency of the third vibration type data is a multiple of the signal receiving frequency of the Bluetooth module 630 receiving the Bluetooth signal.

For example, the processor 710 of the external device 700 may also directly generate two corresponding third vibration type data according to the movement speed at the current time of the user's index finger and middle finger on the touch screen, and provide the data to the embedded system 600 via the Bluetooth signal. Next, the MCU 610 may update the third vibration type data configured to drive the actuator 642_1 in a predetermined time interval, such as five consecutive vibration type class bytes within 5 ms as shown in FIG. 9A (e.g., having the values "0", "20", "40", "60", "80"

respectively) to the Bluetooth data buffers B1 to B5, so that the actuator 642_1 may achieve the vibration effect of a vibration intensity variation curve 1001 as shown in FIG. 10A. Moreover, the MCU 610 may update the third vibration type data configured to drive the actuator 642_2 in a predetermined time interval, such as five consecutive vibration type class bytes within 5 ms as shown in FIG. 9A (e.g., having the values "0", "120", "0", "120", "0" respectively) to the Bluetooth data buffers B6 to B10, so that the actuator 642_2 may achieve the vibration effect of a vibration intensity variation curve 1002 as shown in FIG. 10B. In the present example, each of the vibration type class bytes may correspond to the vibration intensity of the actuator at the current time. In other words, the MCU 610 continuously drives the actuator 642_1 according to the data of the Bluetooth data buffers B1 to B5, so that the actuator 642_1 may gradually increase the vibration intensity continuously for 5 ms, and the MCU 610 continuously drives the actuator 642_2 according to the data of the Bluetooth data buffers B6 to B10, so that the actuator 642_2 may vibrate intermittently within 5 ms.

Next, the processor 710 of the external device 700 also directly generates two corresponding third vibration type data according to the movement speed at the next time of the user's index finger and middle finger on the touch screen, and provide the data to the embedded system 600 via the Bluetooth signal. Next, the MCU 610 may update the third vibration type data configured to drive the actuator 642_1 in a predetermined time interval, such as five consecutive vibration type class bytes within 5 ms as shown in FIG. 9B (such as values "80", "60", "40", "20", "0" respectively) to the Bluetooth data buffers B1 to B5, so that the actuator 642_1 may achieve the vibration effect of a vibration intensity variation curve 1101 as shown in FIG. 11A. Moreover, the MCU 610 may update the third vibration type data configured to drive the actuator 642_2 in a predetermined time interval, such as five consecutive vibration type class bytes within 5 ms as shown in FIG. 9B (such as values "120", "0", "120", "0", "120" respectively) to the Bluetooth data buffers B6 to B10, so that the actuator 642_2 may achieve the vibration effect of a vibration intensity variation curve 1102 as shown in FIG. 11B. In the present example, each of the vibration type class bytes may be the vibration intensity of the actuator at the current time. In other words, the MCU 610 continuously drives the actuator 642_1 according to the data of the Bluetooth data buffers B1 to B5, so that the actuator 642_1 may gradually reduce the vibration intensity continuously for 5 ms, and the MCU 610 intermittently drives the actuator 642_2 according to the data of the Bluetooth data buffers B6 to B10, so that the actuator 642_2 may vibrate intermittently within 5 ms. As a result, the MCU 610 may output a driving signal to the drivers 641_1 and 641_2 according to the third vibration type data, so that the drivers 641_1 and 641_2 may drive the actuators 642_1 and 642_2 to allow the user to feel the haptic feedback effect in real-time in the form of vibration varying with the movement speed of the fingers during the process of contacting the virtual touch scenario 750.

Figure 12:
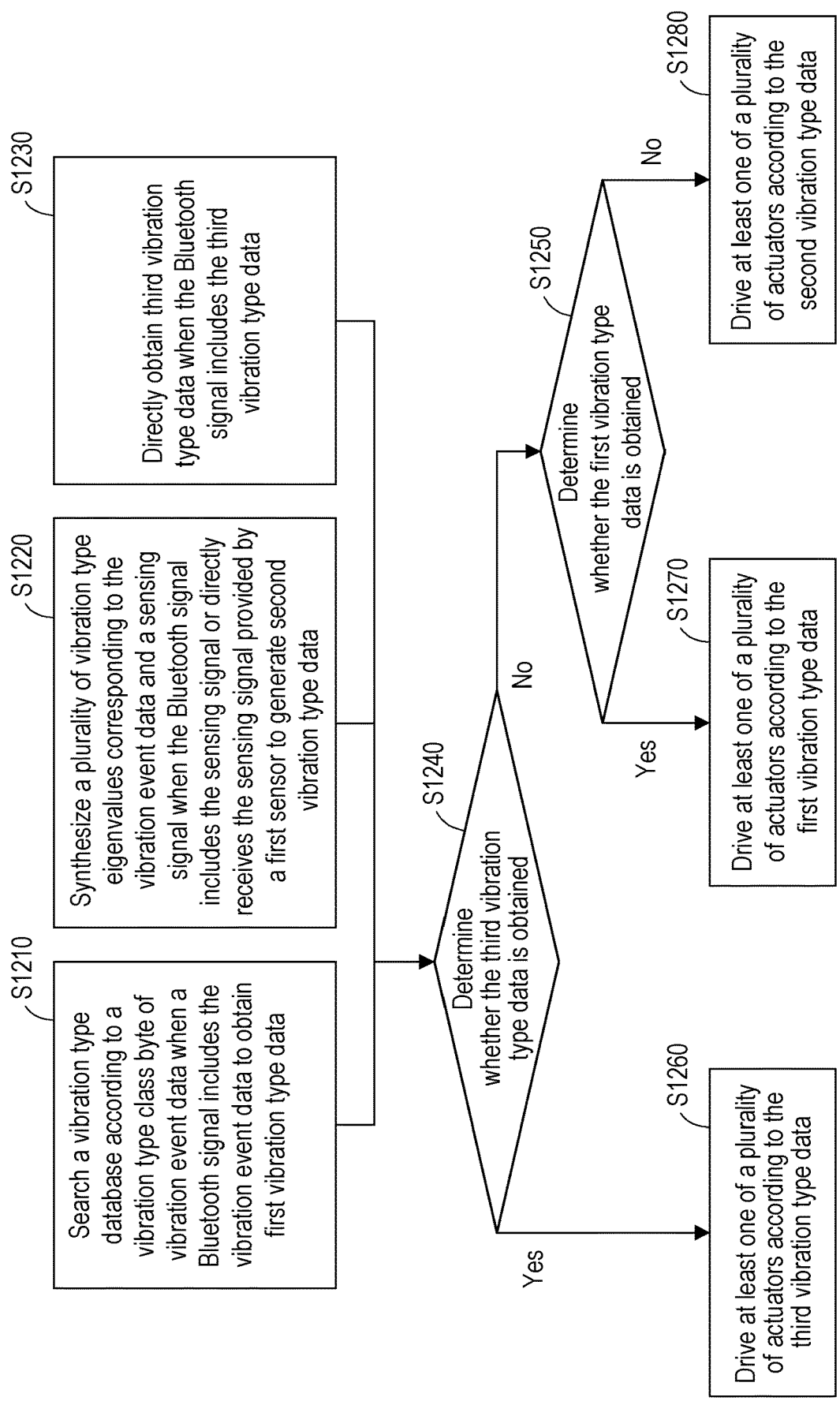
FIG. 12 is a flowchart of a vibration driving method of another embodiment of the disclosure.

FIG. 12 is a flowchart of a vibration driving method of another embodiment of the disclosure. Referring to FIG. 6 and FIG. 12, the MCU 610 of the embedded system 600 may perform the following steps S1210 to S1280 to determine to drive or stop at least one of the actuators 642_1 to 642_N according to the first vibration type data, the second vibration type data, or the third vibration type data. The embedded system 600 may receive at least one of the Bluetooth signal provided by the external device 700 and the sensing signal provided by the second sensor 740 via the Bluetooth module 630. In step S1210, when the MCU 610 determines the Bluetooth signal includes vibration event data, the MCU 610 may search the vibration type database 621 according to the vibration type class bytes of the vibration event data to obtain first vibration type data. In this regard, reference may be made to the description of the embodiment of FIG. 4A to FIG. 4C for the specific implementation manner of obtaining the first vibration type data. In step S1220, when the MCU 610 determines the Bluetooth signal includes a sensing signal or directly receives the sensing signal provided by a first sensor, a plurality of vibration type eigenvalues corresponding to the vibration event data and the sensing signal are synthesized to generate second vibration type data. In this regard, reference may be made to the description of the embodiment of FIG. 8 for the specific implementation of obtaining the second vibration type data. In step S1230, when the MCU 610 determines the Bluetooth signal includes third vibration type data, the MCU 610 directly obtains the third vibration type data. In this regard, reference may be made to the description of the embodiment of FIG. 9A to FIG. 9B for the specific implementation manner of obtaining the third vibration type data.

It is worth noting that whether or not steps S1210 to S1230 occur is determined according to the current operating environment or application type. When the MCU 610 executes at least one of steps S1210 to S1230 to obtain the vibration type data, in step S1240, the MCU 610 first determines whether to obtain the third vibration type data. If yes, in step S1260, the MCU 610 drives at least one of the actuators 642_1 to 642_N according to the third vibration type data. If not, in step S1250, the MCU 610 then determines whether to obtain the first vibration type data. If yes, in step S1270, the MCU 610 drives at least one of the actuators 642_1 to 642_N according to the first vibration type data. If not, in step S1280, the MCU 610 drives at least one of the actuators 642_1 to 642_N according to the second vibration type data. In other words, the MCU 610 may have the function of obtaining the first vibration type data, the second vibration type data, or the third vibration type data, and may preferentially drive the actuators 642_1 to 642_N according to the third vibration type data, wherein the first vibration type data is next, and the second vibration type data has the lowest priority. Therefore, the embedded system 600 and the vibration driving method of the present embodiment may provide a haptic feedback effect in the form of vibration that may be synchronized with the current operating behavior of the user. Moreover, the embedded system 600 and the vibration driving method of the present embodiment may transmit vibration event data having a low amount of data by using a Bluetooth signal or directly receive vibration type data transmitted by the Bluetooth signal to achieve real-time vibration feedback function for diverse applications and low latency.

Based on the above, the embedded system and the vibration driving method of the disclosure may achieve various ways of obtaining vibration type data. The embedded system of the disclosure may receive vibration event data having a low amount of data using a Bluetooth signal, and the embedded system obtains the corresponding vibration type data according to the vibration event data, or the embedded system directly receives the vibration type data transmitted via the Bluetooth signal. Therefore, the embedded system and the vibration driving method of the disclosure may be used in various applications, and may achieve real-time vibration feedback function having low latency.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An embedded system, comprising:
   a vibration module comprising a plurality of actuators;
   a Bluetooth module configured to receive a Bluetooth signal provided by an external device;
   a storage module configured to store a vibration type database, wherein the vibration type database is pre-established and stores a plurality of vibration type data corresponding to a plurality of different vibration type numbers; and
   a microcontroller unit coupled to the vibration module, the Bluetooth module, and the storage module,
   wherein when the microcontroller unit determines the Bluetooth signal comprises vibration event data, the microcontroller unit searches the vibration type database to obtain first vibration type data according to a vibration type class byte of the vibration event data in the Bluetooth signal;
   wherein when the microcontroller unit determines the Bluetooth signal further comprises a second sensing signal or directly receives the second sensing signal provided by a first sensor, the microcontroller unit executes a synthesis module to select a plurality of specific vibration type eigenvalues from the vibration type database according to the vibration event data and the second sensing signal to synthesize second vibration type data according to the vibration type eigenvalues; and
   wherein the microcontroller unit drives at least one of the actuators according to the first vibration type data or the second vibration type data.

2. The embedded system of claim 1, wherein the microcontroller unit determines whether to drive at least one of the actuators according to the first vibration type data according to an event byte of the vibration event data.

3. The embedded system of claim 2, wherein the vibration type class byte and the event byte of the vibration event data are dynamically updated in response to a plurality of vibration events corresponding to the actuators, and the microcontroller unit updates the vibration type class byte and the event byte of the vibration event data to a plurality of Bluetooth data buffers to dynamically drive or stop at least one of the actuators according to a data update status of the Bluetooth data buffers.

4. The embedded system of claim 2, wherein the external device generates the Bluetooth signal according to a first sensing signal provided by a first sensor and an application information provided by an application program executed by the external device.

5. The embedded system of claim 1, wherein the microcontroller unit further receives a third sensing signal provided by a second sensor and selects the specific vibration type eigenvalues according to the vibration event data, the second sensing signal, and the third sensing signal to synthesize the second vibration type data according to the vibration type eigenvalues.

6. The embedded system of claim 1, wherein when the microcontroller unit determines the Bluetooth signal comprises the vibration event data or the second sensing signal, the microcontroller unit chooses to drive at least one of the actuators according to the first vibration type data,
   wherein when the microcontroller unit determines the Bluetooth signal comprises the second sensing signal and does not comprise the vibration event data, the microcontroller unit chooses to drive at least one of the actuators according to the second vibration type data.

7. The embedded system of claim 6, wherein when the microcontroller unit determines the Bluetooth signal comprises third vibration type data corresponding to at least one of the actuators, the microcontroller unit preferentially chooses to drive at least one of the actuators according to the third vibration type data;
   wherein the microcontroller unit updates a plurality of consecutive vibration type class bytes of the third vibration type data to a plurality of Bluetooth data buffers within a predetermined time interval to continuously drive at least one of the actuators within the predetermined time interval according to a data update status of the Bluetooth data buffers.

8. The embedded system of claim 7, wherein a vibration type frequency of the third vibration type data is a multiple of a signal receiving frequency of the Bluetooth module receiving the Bluetooth signal.

9. A vibration driving method, suitable for an embedded system, wherein the embedded system comprises a vibration module, a Bluetooth module, and a storage module, and the vibration driving method comprises:
   storing a vibration type database via the storage module, wherein the vibration type database is pre-established and stores a plurality of vibration type data corresponding to a plurality of different vibration type numbers;
   receiving a Bluetooth signal provided by an external device via the Bluetooth module;
   searching the vibration type database to obtain first vibration type data according to a vibration type class byte of vibration event data in the Bluetooth signal when a microcontroller unit determines the Bluetooth signal comprises the vibration event data;
   selecting a plurality of specific vibration type eigenvalues from the vibration type database according to the vibration event data and a second sensing signal to synthesize second vibration type data according to the vibration type eigenvalues when the microcontroller unit determines the Bluetooth signal further comprises the second sensing signal or directly receives the second sensing signal provided by a first sensor; and
   driving at least one of a plurality of actuators of the vibration module according to the first vibration type data or the second vibration type data.

10. The vibration driving method of claim 9,
    wherein the step of driving at least one of the actuators of the vibration module comprises:
    determining whether to drive at least one of the actuators according to the first vibration type data according to an event byte of the vibration event data.

11. The vibration driving method of claim 10, wherein the vibration type class byte and the event byte of the vibration event data are dynamically updated in response to a plurality of vibration events corresponding to the actuators, wherein the step of driving at least one of the actuators of the vibration module further comprises:
    updating the vibration type class byte and the event byte of the vibration event data to a plurality of Bluetooth data buffers; and dynamically driving or stopping at least one of the actuators according to a data update status of the Bluetooth data buffers.

12. The vibration driving method of claim 10, wherein the external device generates the Bluetooth signal according to a first sensing signal provided by a first sensor and an application information provided by an application program executed by the external device.

13. The vibration driving method of claim 10, wherein the step of generating the second vibration type data comprises:
   receiving a third sensing signal provided by a second sensor; and
   selecting the specific vibration type eigenvalues according to the vibration event data, the second sensing signal, and the third sensing signal, so as to synthesize the second vibration type data according to the vibration type eigenvalues.

14. The vibration driving method of claim 9, wherein the step of selecting the first vibration type data or the second vibration type data to drive at least one of the actuators comprises:
   choosing to drive at least one of the actuators according to the first vibration type data when the Bluetooth signal comprises the vibration event data or the second sensing signal; and
   choosing to drive at least one of the actuators according to the second vibration type data when the Bluetooth signal comprises the second sensing signal and does not comprise the vibration event data.

15. The vibration driving method of claim 14, wherein the step of driving at least one of the actuators of the vibration module further comprises:
   preferentially choosing to drive at least one of the actuators according to third vibration type data when the Bluetooth signal comprises the third vibration type data corresponding to at least one of the actuators;
   updating a plurality of consecutive vibration type class bytes of the third vibration type data to a plurality of Bluetooth data buffers within a predetermined time interval; and
   continuously driving at least one of the actuators within the predetermined time interval according to a data update status of the Bluetooth data buffers.

16. The vibration driving method of claim 15, wherein a vibration type frequency of the third vibration type data is a multiple of a signal receiving frequency of the Bluetooth module receiving the Bluetooth signal.

* * * * *